Figure 1:
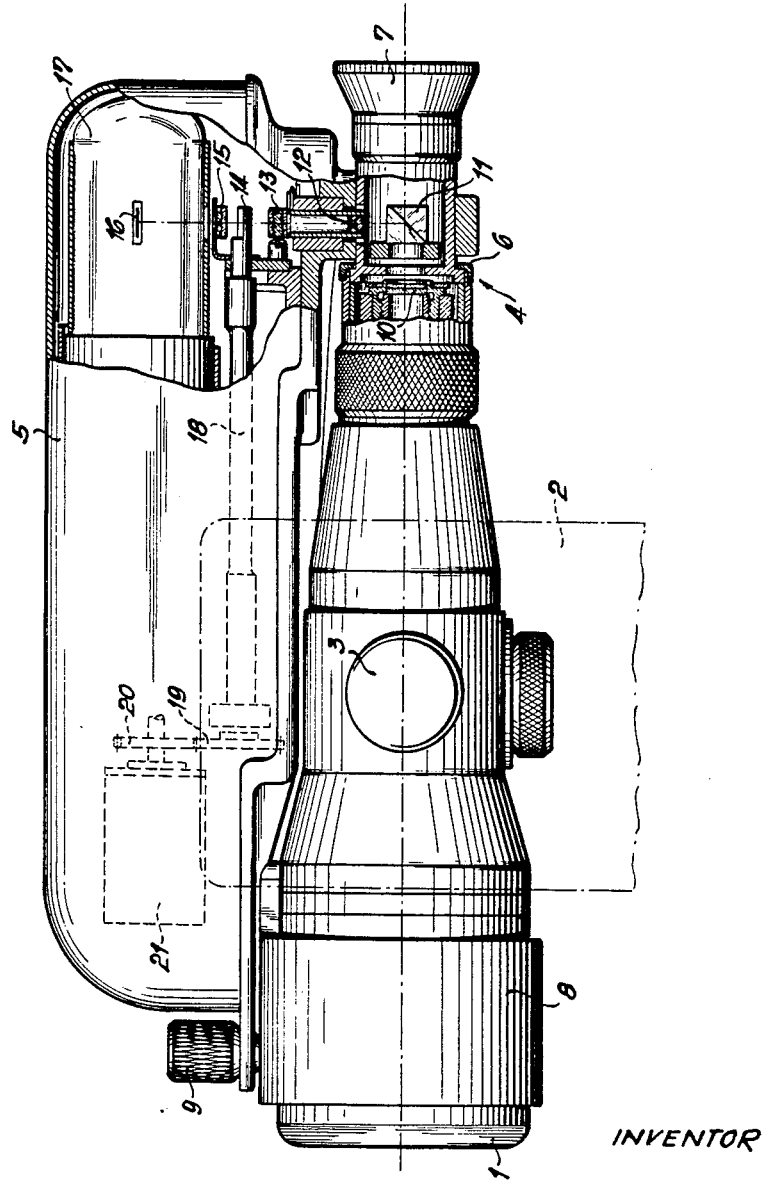

Sept. 25, 1962 G. WEHLING 3,055,260
PHOTO-ELECTRIC SIGHT ADJUSTING DEVICE
Filed Jan. 2, 1959 2 Sheets-Sheet 1

INVENTOR
Georg Wehling
By: Samuel W. Kipnis
Atty.

Sept. 25, 1962 G. WEHLING 3,055,260
PHOTO-ELECTRIC SIGHT ADJUSTING DEVICE
Filed Jan. 2, 1959 2 Sheets-Sheet 2
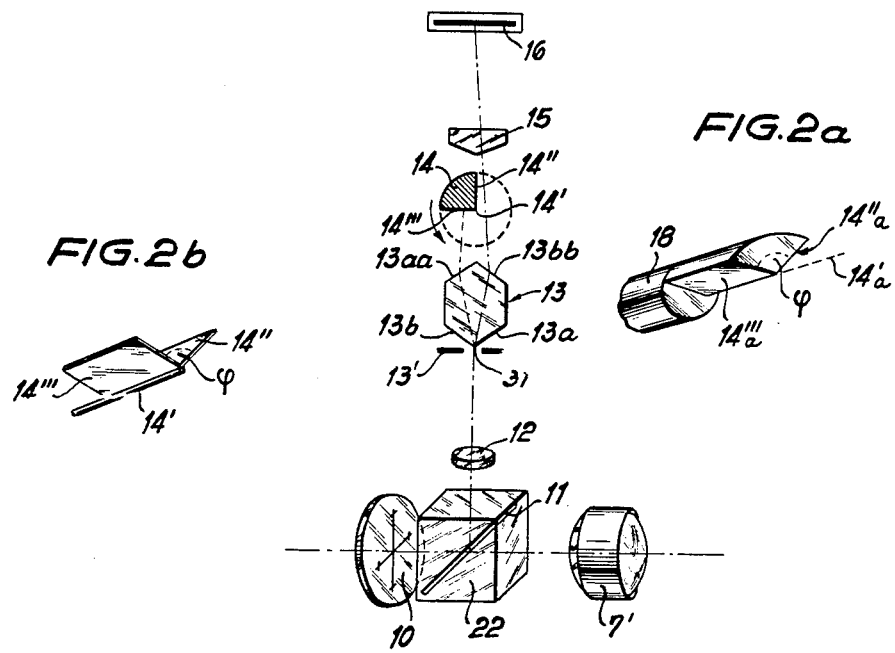
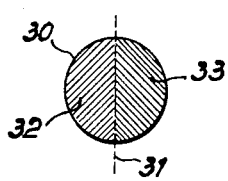
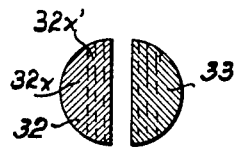
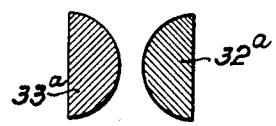
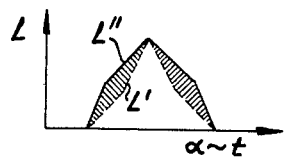
INVENTOR
Georg Wehling
By: Samuel W. Kipnis
Atty.

United States Patent Office 3,055,260
Patented Sept. 25, 1962

3,055,260
PHOTO-ELECTRIC SIGHT ADJUSTING DEVICE
Georg Wehling, Berlin-Lichterfelde, Germany, assignor to Askania-Werke A.G., Berlin-Friedenau, Germany, a corporation of Germany
Filed Jan. 2, 1959, Ser. No. 784,660
Claims priority, application Germany Jan. 21, 1958
1 Claim. (Cl. 88—14)

This invention relates to a photo-electric device for automatically or objectively sighting a target, particularly a luminous marker or other light emitting or light reflecting object as used for the aiming of geodetical angle measuring instruments and the like The invention has the object to improve the sensitivity of such a device and especially to improve the signal-noise ratio. It was found possible to make definite progress in this direction by incorporating in the light circuit utilized by the instrument a novel combination of optical elements, improving the geometry of the target image for purposes of photo-electric analysis.

The invention will be understood more readily upon a consideration of such target images, as obtained in practice by the telescopic viewing of remote, localized light emitters and light reflectors. The illuminance of an image area by such objects is non-homogeneous as to shape of source image and light flux distribution, and both shape and intensity of the source image are subject to pulsations due to air movements resulting from temperature differences in the layers of air between the instrument and the target.

It has been usual to divide the source image into a pair of image portions, then alternately to expose such image portions to a single photometric element, and then to compare their light fluxes by the output of said element, insofar as such comparison was possible because of unavoidable noise of the instrument. "Noise," in the sense of the photo-electric measuring art, is also present in the light creating the source image, not only because of the pulsations mentioned but even because of more fundamental characteristics of such an image; and the invention serves to minimize such noise.

For this purpose the invention provides, in novel combination with means or operations for forming a real image of a remote, more or less point-like source, and with a photoelectric analysing device for such image, not only an element for splitting the image into a pair of image portions but also an element—if desired integral with the image splitter—for inverting the split-image arrangement. Image portions, created at an image-splitting edge, are inverted in orientation and/or location relative to similarly created portions, by refraction processes or the like; and it has been found that the signal-noise ratio of the analyzer, analyzing the light fluxes of the image portions, is distinctly improved by such inversion.

The new instrument and the operation thereof are shown in the drawing, wherein FIGURE 1 is a side view, partly in section, of the instrument; FIGURE 2 is a schematic view of the analyzer optics; FIGURE 2a is a perspective view of a detail from FIGURE 2; FIGURE 2b is a modification of FIGURE 2a; FIGURE 3 is a schematic view of the source image at a certain point of the optics of FIGURE 2; FIGURE 3a is a schematic view of a split image as heretofore utilized; FIGURE 3b is a schematic view of the split image with inverted image portions as used in accordance with the invention and by means of a certain element of the optics of FIGURE 2; and FIGURE 4 is a graph of photoelectric output values obtained when using the invention, compared with such values heretofore obtained.

In FIGURE 1, theodolite telescope 1 is shown as shown as being pivoted in a frame 2 by a horizontal axle 3 for altitude adjustment in the sighting of a remote target, not shown; and frame 2 can be rotated, for such sighting, about a vertical axis, not shown. Such rotations are measured by precision circles, not shown. Ocular end 4 of telescope 1 has photoelectric analyzer device 5 secured thereto by threaded ring 6, said device being shown as equipped with an ocular lens 7 at one end and with additional fastening means 8, 9 at the objective end of the telescope.

The objective, which need not be shown in detail, forms an intermediate, real source image on reticle 10 of ocular end 4; and an interference mirror 11 allows not only observation of this image by ocular 7 but simultaneously also reflection of suitable light from such image into optical system 12 of analyzer device 5. This system forms a further real source image in the plane of an image splitting edge of a generally prismatic element 13, which element also serves as image portion inverter. It is followed by revolving shutter 14, collector prism 15, and the photocathode 16 of an electron multiplier photocell 17. Shutter 14 is driven by shaft 18 which in turn is driven by gear drive 19, 20 of motor 21. Cell 17 is connected with an output analyzing circuit known to the art and which need not be shown herein. Angular adjustment of frame 2, for aiming at the remote target, causes displacement of the target image not only relative to reticle 10 but also relative to the image splitting edge of prism 13, forward and backward relative to the plane of the paper in FIGURE 1, thereby modifying the geometry of the image portions and, as a result, their luminance values, and thereby in turn allowing photo-electric analysis of the accuracy of aiming, insofar as it is performed by rotation of the instrument about the vertical axis. Similar analysis can be provided by a second unit, similar to unit 5, with different orientation of the image splitting edge, for accurate aiming by vertical as well as horizontal adjustment.

Details of the optical system 11 to 16 are shown in FIGURE 2. Interference mirror 11 forms an interface layer in a prismatic body 22. Prism 13 has front surfaces 13a, 13b facing said body 22 and forming image splitting front edge 31, said pair of surfaces being convex toward 11, so that light entering the right surface 13a is refracted toward the left in prism 13 and light entering the left surface 13b is similarly refracted toward the right, for combined image splitting and image portion inversion.

Desirably a narrow diaphragm 13' is disposed in or adjacent the plane of edge 31 for limiting the field of view which includes the source image, the diaphragm aperture being circular and concentric with the optical axis of the instrument, which axis passes through edge 31. It is further preferred that prism 13 be formed with rear surfaces 13aa, 13bb which constitute a system convex toward photocathode 16 in order to collimate, or prevent excessive separation of, the split, inverted image portions, said portions being additionally directed toward one another by prism 15. Revolving shutter 14 is disposed in a first area traversed by the light beams or light fluxes, between surfaces 13aa, 13bb and prism 15 and is best shown in FIGURE 2a. From this area the light fluxes, if not stopped by the shutter, pass through collector prism 15 into a second or ultimate area where photocell 16 is located. Preferably and in accordance with the Dobberstein Patent 2,968,736 the shutter has the form of a cylinder sector with axis 14' and straight sides 14", 14''' including angle φ, said axis being approximately normal to and intersecting the optical axis of the instrument. Said angle is selected so as to provide consecutive time intervals during which the revolving shutter exposes one split, inverted image portion, no image portion, and the other split, inverted image portion; such operation can be provided also by different shutters, such for instance as that of FIGURE 2b, wherein 14'a is the shaft of the shutter and 14"a, 14'''a are flat vanes thereon.

Not only because of the unavoidable smallness of a sharply defined, remote target marker, seen through the telescope, but also in view of inescapable limitations of the photocathode the split target image must be very small and more or less point-like, subject to the limitations imposed by the wave-nature of light. The beam providing the unsplit image is not substantially larger than the broken vertical line between elements 12 and 13 in FIGURE 2; and the cross-section thereof, ahead of edge 31, is shown with great enlargement in circle 30 of FIGURE 3. The latter figure shows the image schematically, with the image splitting edge 31 disposed diametrically of circle 30 and dividing it into semicircles 32, 33 of equal size and substantially equal appearance. In reality the image portions divided by such an edge or axis are not of equal appearance. As already indicated, factors such as distribution of brightness are disturbed by atmospheric conditions prevailing between the target and the telescope (optical noise); like-wise the response of the photosensitive, electrical system to the image portions is disturbed by influences of the photocell and of other circuit elements (electronic noise).

Converging, optical refractors 13aa, 13bb and 15 are among the means for minimizing the electronic noise, by directing the image portions to be analyzed upon a single, small element of the photocell; and the image element inverting arrangement of refractor 13a, 13b serves to minimize the optical noise. Heretofore, image splitting was performed by devices, usually reflectors, which formed split image portions 32, 33 as shown in FIGURE 3a. According to the invention, by contrast, there are formed split and side reversed image portions 32a, 33a as shown in FIGURE 3b. The reversal is achieved by refractor prism element 13a, 13b, shown in FIGURE 2.

The advantage of FIGURE 3b over 3a can best be explained in connection with FIGURE 4, wherein L is illuminance and t is time, reference being had to the time period of a revolution of shutter 14. Curve L' shows the successive illuminance values applied to photocathode 16 by the gradual opening of shutter 14, which for instance exposes the photocathode to successive portions or infinitesimal subdivisions 32x, 32x+32x', etc., of the first image portion 32 and thereafter, similar subdivisions of the second image portion 33. While scanning across portion 32, curve L' rises first slightly and then more sharply, not only because of the geometry of semicircle 32 and shutter 14 but especially also because of the outward decrease of brilliance of image 30, encountered regardless of all details of diffraction phenomena and the like and regardless of the degree to which said image fills the aperture of diaphragm 13'. For the same reasons, curve L', while scanning across portion 33, falls first sharply and then more gradually. By contrast, curve L", which similarly corresponds with successive photocathode illuminance values obtained according to the invention, has sharper initial rise and sharper terminal fall.

The photoelectric analysis of the image is dependent on integration of stimuli received by the photocathode; more specifically, on comparison of time integrals of successive illuminance values. In the case of FIGURE 3a and curve L' it depends on comparing the area of diagram 4, below the rising portion of said curve, with the area below the falling portion of said curve. In the case of FIGURE 3b it utilizes the corresponding areas below curve L". The latter areas are larger; as a result they furnish a positive comparison at a higher level of optical and/or electronic noise, in the above-defined sense. Differently expressed: the signal-noise ratio is improved by optically crispening the light signals, which in turn is achieved by inverting the split point image portions, that is, by turning their broad and bright subdivisions outwardly.

Details of the process involving this crispening are of course dependent on the exact optics employed. In FIGURE 4, the zero-exposure interval provided by shutter 14 has been assumed to be of negligible length; it can however be made either longer or shorter, causing either separation or overlapping of horizontally successive portions of curve L". It is also possible to effect the inverting by optics separate from those of an image splitter, and for instance by individual optics for one or both of the split image beams, it being desirable however to simplify such arrangements as result in uniform absorption conditions and the like, for which reason the combined beam splitter and inverter 13 is preferred.

The overall sensitivity of the instrument, especially when using optimum optics and electronics, with minimum optical and electronic noise, has been sensibly improved by the invention and the instrument has been made capable of response to and measurement of signals of considerable lower strength than were heretofore required.

I claim:

A photometric device for comparing light fluxes coming from a substantially point-like image of a remote light source, comprising:

a prism unit having a front edge in the plane of said image for splitting said image into a pair of image portions of normally approximately semicircular shape and for thus normally providing split light fluxes of similar shape in cross-section, said prism unit having a refracting body portion for so inverting light fluxes as to pass them through a first area past the prism unit with their normally approximately semicircular cross-sectional curvatures facing one another, for ultimate convergent passage into a second area past the prism unit;

a shutter in said first area for stopping and passing each of said split, inverted light fluxes in a predetermined sequence; and a photosensitive element in said second area for sensing the split, inverted, sequentially passed light fluxes.

References Cited in the file of this patent

UNITED STATES PATENTS

| | | |
|---|---|---|
| 1,451,302 | Mihalyi | Apr. 10, 1923 |
| 1,501,979 | Willson | July 22, 1924 |
| 2,383,075 | Pineo | Aug. 21, 1945 |
| 2,850,939 | Steel | Sept. 9, 1958 |
| 2,917,967 | Steglich | Dec. 22, 1959 |
| 2,968,736 | Dobberstein | Jan. 17, 1961 |